United States Patent
Anspaugh et al.

(10) Patent No.: US 12,319,336 B1
(45) Date of Patent: Jun. 3, 2025

(54) CUSTOMIZABLE CAM CLAMPING ASSEMBLY FOR STEERING COLUMN

(71) Applicant: Steering Solutions IP Holding Corporation, Saginaw, MI (US)

(72) Inventors: Michael P. Anspaugh, Bay City, MI (US); Randy W. Jones, North Branch, MI (US); Donald A. Buzzard, Saginaw, MI (US); Lelio Huang, Chongqing (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/521,333

(22) Filed: Nov. 28, 2023

(51) Int. Cl.
  B62D 1/184 (2006.01)
  B62D 1/185 (2006.01)

(52) U.S. Cl.
  CPC ............. B62D 1/184 (2013.01); *B62D 1/185* (2013.01)

(58) Field of Classification Search
  CPC ................................ B62D 1/184; B62D 1/185
  See application file for complete search history.

(56) References Cited

U.S. PATENT DOCUMENTS

| | | | | |
|---|---|---|---|---|
| 2009/0151498 A1* | 6/2009 | Garbrecht | ................ | B62D 1/19 74/493 |
| 2014/0318304 A1* | 10/2014 | Hahn | .................... | F16H 25/186 74/493 |

FOREIGN PATENT DOCUMENTS

DE  102006009304 B3 *  7/2007  ............. B62D 1/184

OTHER PUBLICATIONS

Garbrecht et al. DE 10 2006 009304 English Translation (Year: 2007).*

* cited by examiner

*Primary Examiner* — Karen Beck
(74) *Attorney, Agent, or Firm* — Dickinson Wright PLLC

(57) ABSTRACT

A cam clamping assembly includes a lever rotatable between the locked position and the unlocked position of the cam clamping assembly. The cam clamping assembly also includes a cam follower operatively coupled to the lever and rotatable with the lever, the cam follower having an inner surface with at least one cam follower member extending therefrom. The cam clamping assembly further includes a cam having an outer surface in contact with the inner surface of the cam follower, wherein the outer surface of the cam includes at least one cam member extending therefrom and in contact with the cam follower member, wherein the cam member is a ramped surface having a contact path portion and at least one relief portion, wherein the cam follower member is only in contact with the contact path portion of the cam member during relative movement between the cam follower and the cam.

9 Claims, 6 Drawing Sheets

CUSTOMIZABLE CAM CLAMPING ASSEMBLY FOR STEERING COLUMN

FIELD OF THE INVENTION

The following description relates to a lock for an adjustable steering column and, in particular, a customizable cam clamping assembly for adjustable steering columns.

BACKGROUND

Steering columns in vehicles may be adjustable in a rake direction and a telescope direction. The adjustable steering column may be unlocked in order to be adjusted to a desired position. Once the desired position is reached, the steering column may be locked in place to resist movement from the desired position.

Clamp mechanism cams are used on many manually adjusted rake and telescope or rake steering columns. A cam profile interfaces with a contacting follower that is connected to a lever. The vehicle driver rotates the lever from an unlocked position to a locked position to secure the steering wheel location. An increasing clamp force is generated throughout the locking motion with the intent to generate a targeted clamp load in the locked position. Most OEMs have specifications that limit the maximum allowable lever locking force and minimum allowable lever unlock force. These specifications can challenge the ability to achieve a target clamp load in the locked position.

SUMMARY

According to one aspect of the disclosure, a cam clamping assembly for an adjustable steering column assembly is provided. The steering column assembly is adjustable in an unlocked position of the cam clamping assembly and is in a fixed position in a locked position of the cam clamping assembly. The cam clamping assembly includes a lever rotatable between the locked position and the unlocked position of the cam clamping assembly. The cam clamping assembly also includes a cam follower operatively coupled to the lever and rotatable with the lever, the cam follower having an inner surface with at least one cam follower member extending therefrom. The cam clamping assembly further includes a cam having an outer surface in contact with the inner surface of the cam follower, wherein the outer surface of the cam includes at least one cam member extending therefrom and in contact with the cam follower member, wherein the cam member is a ramped surface having a contact path portion and at least one relief portion, wherein the cam follower member is only in contact with the contact path portion of the cam member during relative movement between the cam follower and the cam.

According to another aspect of the disclosure, a cam clamping assembly for an adjustable steering column assembly is provided. The steering column assembly is adjustable in an unlocked position of the cam clamping assembly and is in a fixed position in a locked position of the cam clamping assembly. The cam clamping assembly includes a lever rotatable between the locked position and the unlocked position of the cam clamping assembly. The cam clamping assembly also includes a cam follower operatively coupled to the lever and rotatable with the lever, the cam follower having an inner surface with at least one cam follower member extending therefrom. The cam clamping assembly further includes a cam having an outer surface in contact with the inner surface of the cam follower, wherein the outer surface of the cam includes at least one cam member extending therefrom and in contact with the cam follower member, wherein the cam member is a ramped surface having a contact path portion and at least one relief portion, wherein the at least one relief portion has at least one variation from the contact path portion.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
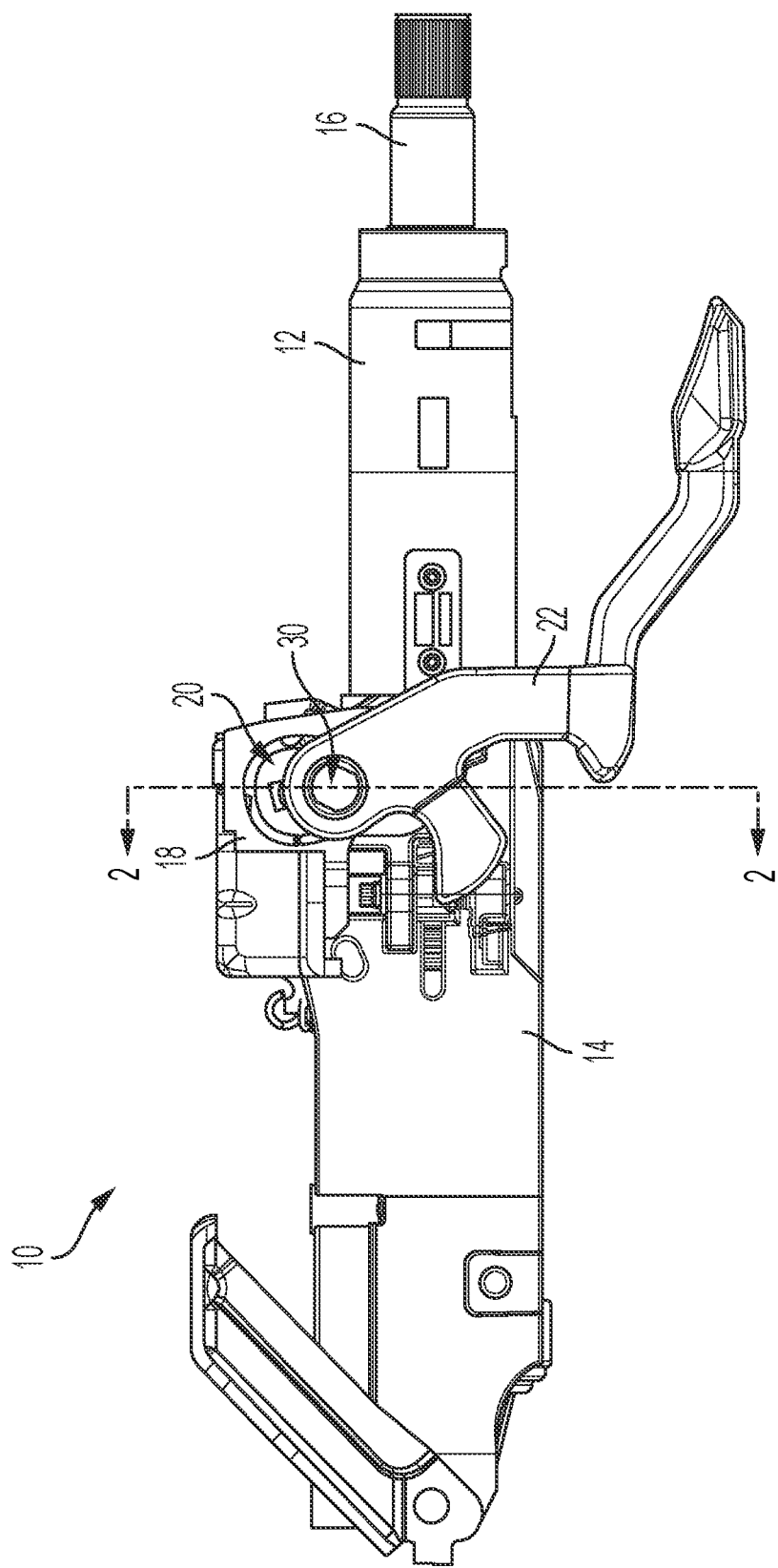
FIG. 1 is a side, elevation view of a steering column assembly having a cam clamping assembly to selectively lock and unlock a position of the steering column assembly.
Figure 2:
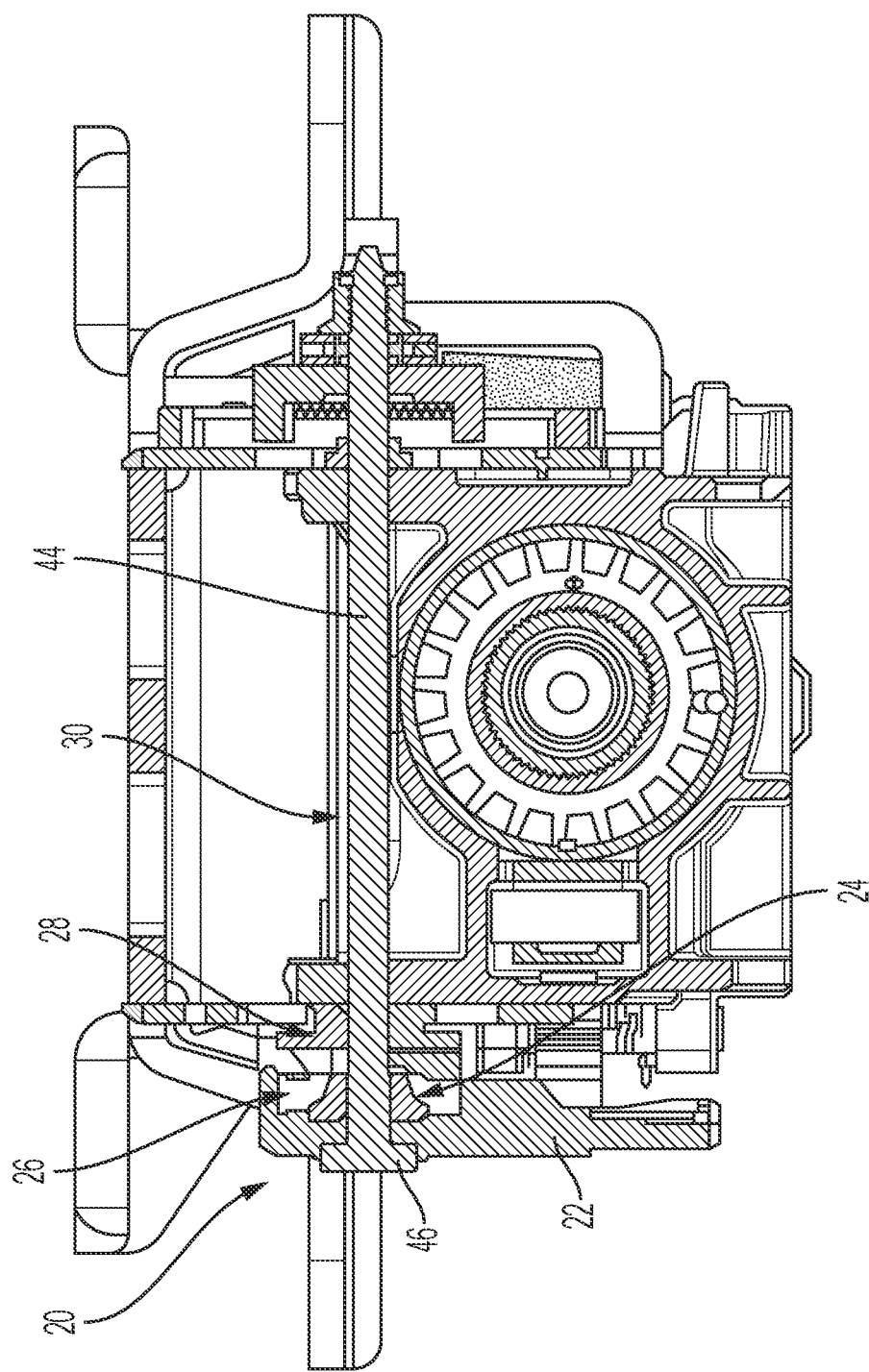
FIG. 2 is a cross-sectional view taken along line A-A of FIG. 1 to illustrate the cam clamping assembly.

Referring to FIGS. 1 and 2, a steering column assembly for a vehicle is shown and generally referenced with numeral 10. The steering column assembly 10 includes one or more jackets, such as an upper jacket 12 and a lower jacket 14. The upper jacket 12 houses a portion of a steering shaft 16 which is operatively coupled to a steering wheel (not shown). The lower jacket 14 is operatively coupled to a mounting bracket 18 that assists with mounting the steering column assembly 10 to the vehicle structure. It is to be appreciated that, as an alternative to the two-jacket assembly shown and described above, a single jacket may be present in some embodiments and more than two jackets may be present in other embodiments.

The steering column assembly 10 may be used in any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as aircrafts, boats, trains, drones, or other vehicles. The steering column assembly 10 may be configured as a driver interface steering system, an autonomous driving system, or a system that allows for both driver interface and autonomous steering.

The steering column assembly 10 includes a cam clamping assembly 20 to selectively place the steering column assembly 10 in a locked condition and an unlocked condition based on a locked position and an unlocked position of the cam clamping assembly 20. In particular, a rotatable lever 22 is configured to actuate the cam clamping assembly 20 between the locked position and the unlocked position, and vice versa. The rotatable lever 22 is an extension of the clamping arrangement 20 into a cabin (not shown) of the vehicle, the lever 22 being accessible to a driver (not shown). The driver may engage the lever 22 in order to transition the steering column assembly 10 from the locked position to the unlocked position, or vice versa. In an unlocked position of the cam clamping assembly 20, the position of the steering column assembly 10 is adjustable and, when rotated into a locked position, the position of the steering column assembly 10 is fixed.

The cam clamping assembly 20 includes a cam follower 24 that may be partially or fully disposed within a recessed portion 26 of the lever 22, a cam 28 operatively engaged with the cam follower 24, and a rake bolt 30. The rake bolt 30 extends through the lever 22, the cam follower 24, and the cam 28. The cam follower 24 is a component for converting rotation of the lever 22 to a linear force provided by the cam 28 to clamp the steering column assembly 10. The rake bolt 30 extends through the entire cam clamping assembly 20 and through at least a portion of the steering column assembly 10 to hold both assemblies in place in relation to one another.

Figure 4:
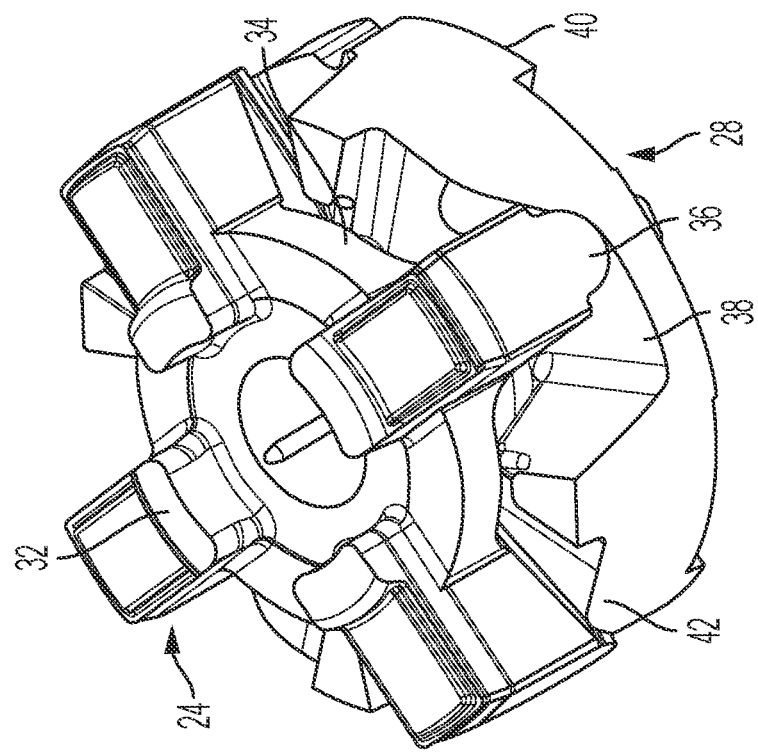
FIG. 4 is a perspective view of a cam and a cam follower of the cam clamping assembly in an unlocked position.
Figure 3:
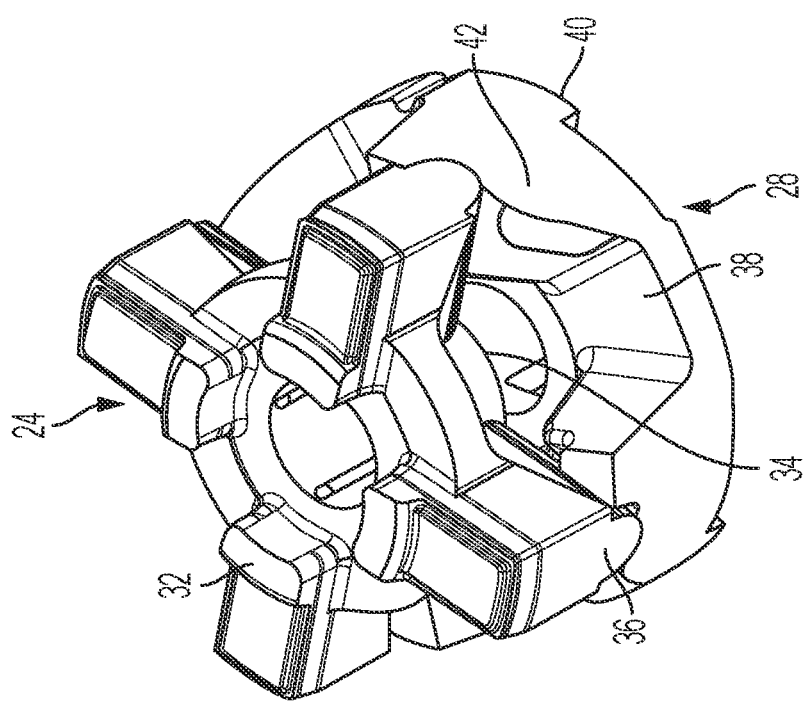
FIG. 3 is a perspective view of a cam and a cam follower of the cam clamping assembly in a locked position.

Referring to FIGS. 3 and 4, the cam follower 24 has an outer face 32 in contact with the lever 22. The cam follower 24 also has an inner face 34 with at least one member 36 thereon which is arranged to engage the cam 28. The cam 28 has an outer face 38 and an inner face 40. The outer face 38 of the cam 28 has at least one member 42 thereon which is arranged to engage the member(s) 36 of the inner face 34 of the cam follower 24. The inner face 40 of the cam 28 is positioned to engage with a component (e.g., lower jacket 14, mounting bracket 18, etc.) of the steering column assembly 10 to create a clamping pressure.

Referring again to FIG. 2, the rake bolt 30 includes a bolt shank 44 and a bolt head 46. The bolt head 46 has an outer diameter which could be circular or square in shape, for example. The outer diameter of the bolt head 46 is used to hold the rake bolt 30 in place relative to the lever 22 which, in some embodiments, allows the rake bolt 30 to rotate with the lever 22 in operation. The bolt shank 44 passes through the lever 22, openings of the cam follower 24 and cam 28, and out the opposite side of the steering column assembly 10. In operation, rotation of the lever 22 causes rotation of the rake bolt 30, and the cam follower 22 between a locked position (FIG. 3) and an unlocked position (FIG. 4). As shown in FIGS. 3 and 4, the member(s) 36 of the cam follower 24 interact with the member(s) 42 of the cam 28 to clamp or unclamp the steering column assembly 10. In the illustrated embodiment, the cam follower 24 and the cam 28 each include four lobes as the members 36, 42, but it is to be appreciated that more or fewer members 36, 42 may be present in other embodiments.

Figure 5:
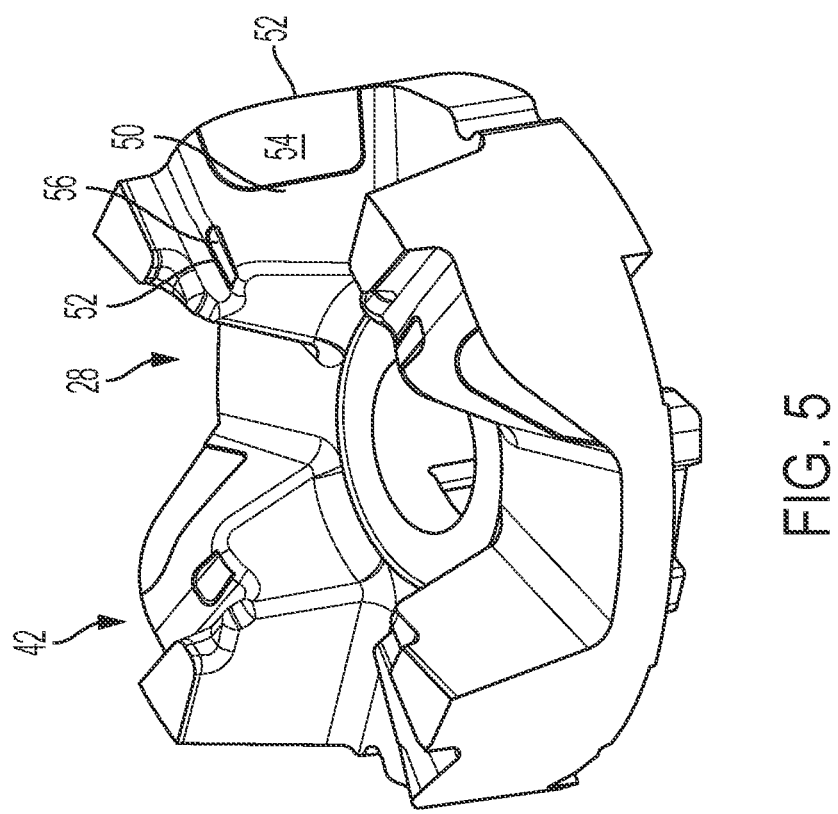
FIG. 5 is a perspective view of the cam illustrating a lock relief feature and an unlock relief feature.

Referring now to FIG. 5, the members 42 of the cam 28 are generally ramped profiles. Each member 42 includes a contact path portion 50 and one or more relief portions 52 that provide a designer with customizable variables to meet lock and unlock effort load requirements for the cam clamping assembly 20. The term "relief portions" refers to one or more variations in the ramp surface of the members 42 of the cam 28. For example, the variations may be recessed from the contact path portion 50 and/or a different surface texture. In the case of a different surface texture, the surface texture of the relief portion(s) 52 have a coefficient of friction less than a coefficient of friction of the contact path portion 50. In the illustrated embodiment, the cam 28 includes a lock relief portion 54 and an unlock relief portion 56 on each of the members 42. However, it is to be appreciated that the members 42 may only include the lock relief portion 54 or may only include the unlock relief portion 56 instead of having both relief portions. Additionally, while all of the members 42 of the cam are shown with relief portions 52, it is to be appreciated that some of the members 42 may not have relief portions 52 in some embodiments and any combination of lock relief portions 54 and unlock relief portions 56 is contemplated. The relief portions 54, 56 may transition abruptly from the contact path portion 50 as a step or the like, or may gradually transition in a smooth manner.

Figure 6:
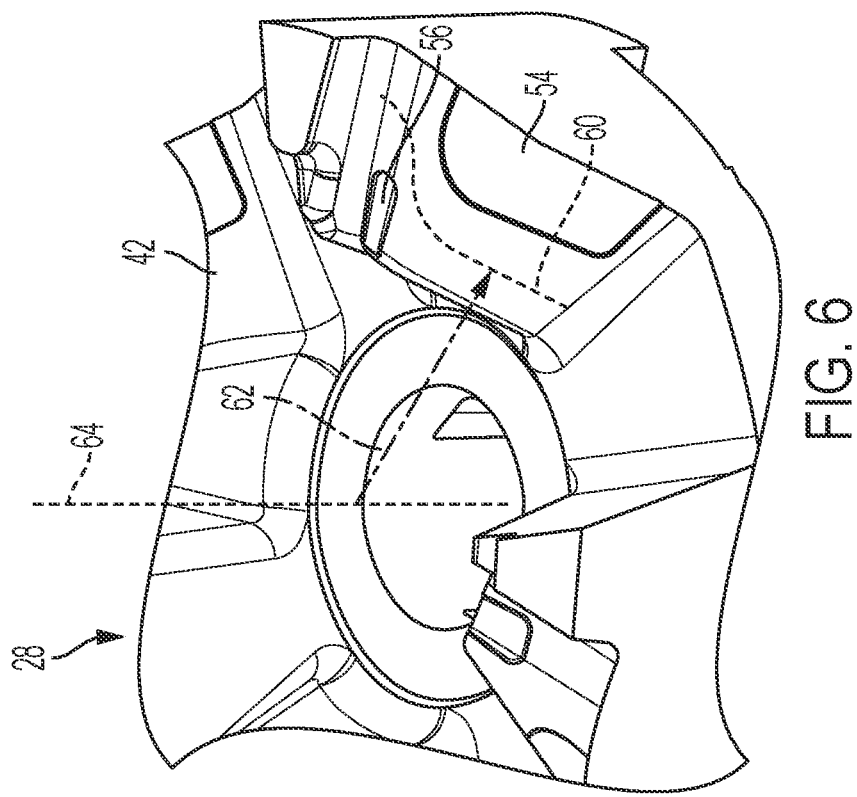
FIG. 6 is a perspective view of a portion of the cam illustrating an average contact radius path over a range of movement between the locked position and the unlocked position of the cam clamping assembly.

Referring now to FIG. 6, an average contact radius path 60 is shown on one of the members 42 of the cam 28. The average contact radius path 60 represents a radial length 62 from an axis of rotation 64 of the cam 28 and the midpoint of the overall surface contact between the cam follower 24 and the cam 28. The presence of the relief portions 54, 56 adjusts the average contact radius path 60 by shifting the radial length 62. In particular, the radial length 62 is shortened along the path adjacent to the lock relief portion 54 since the lock relief portion 54 is located on a radially outer portion of the cam 28. Conversely, the radial length 62 is lengthened along the path adjacent to the unlock relief portion 56 since the unlock relief portion 56 is located on a radially inner portion of the cam 28. The radial length 62 impacts the lever locking and unlocking loads required to lock and unlock the cam clamping assembly 20. In particular, reducing the average contact radius reduces the maximum lever locking and unlocking load, while increasing the average contact radius increases the maximum lever locking and unlocking load. By strategically locating the lock relief portion 54 and the unlock relief portion 56 in the manner shown in the illustrated embodiments, the clamp bolt tension at the locked position can be maximized, the unlock lever torque may be maximized and the lock lever torque can be reduced to obtain the same clamp load. The dimensions and positioning of the relief portions 52 may be customized to achieve the design specification requirements.

Figure 7:
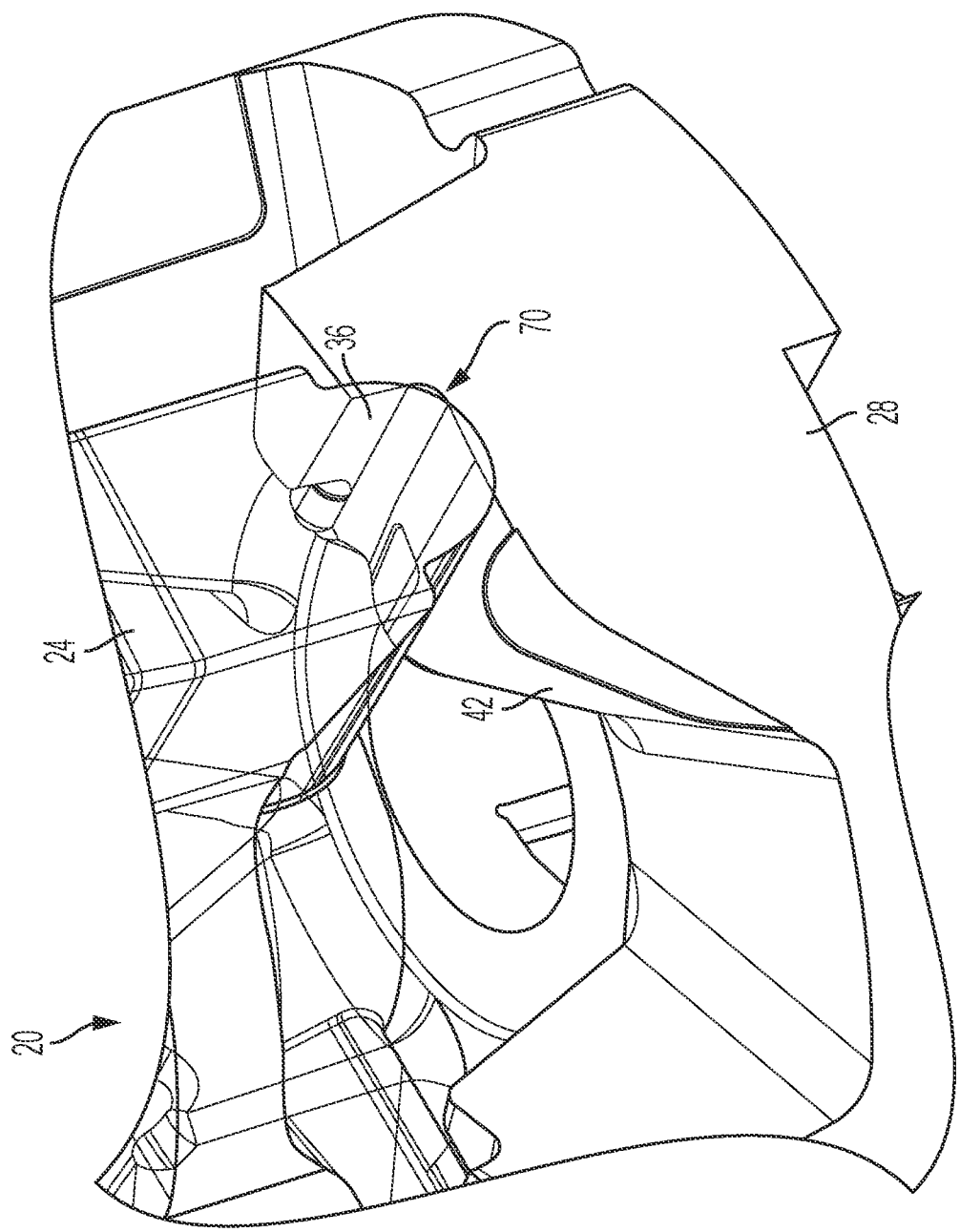
FIG. 7 is a perspective view the cam follower and the cam in the locked position.
Figure 9:
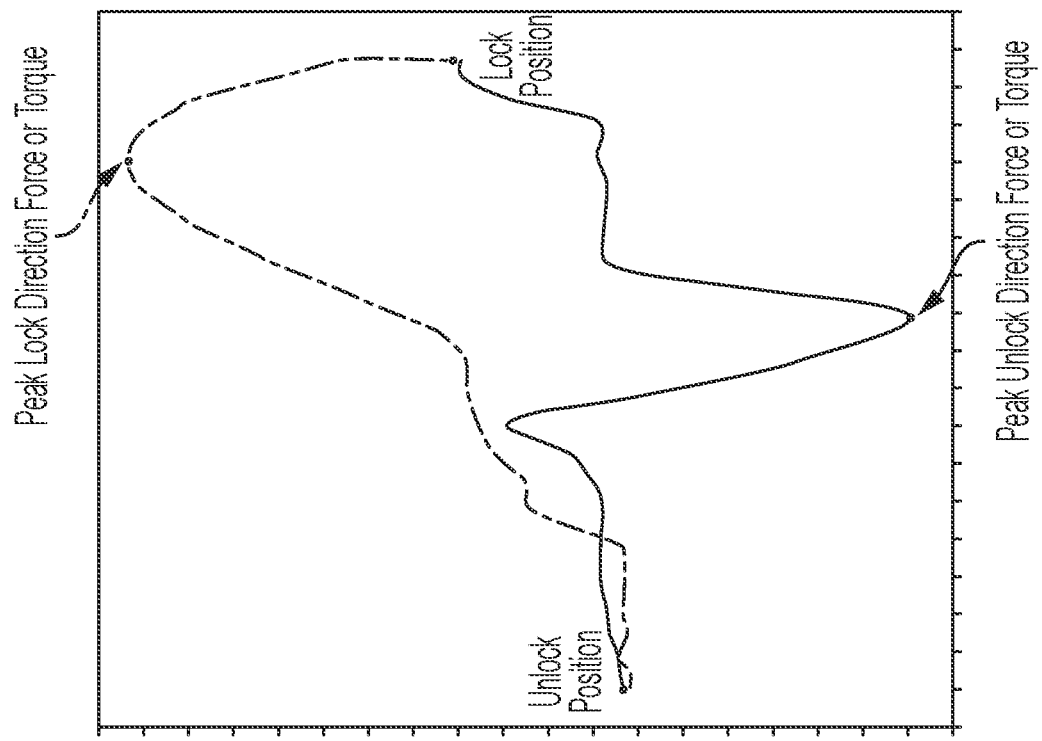
FIG. 9 is a graphical illustration of a torque required to move the cam clamping assembly over a full range of travel between the locked position and the unlocked position.
Figure 8:
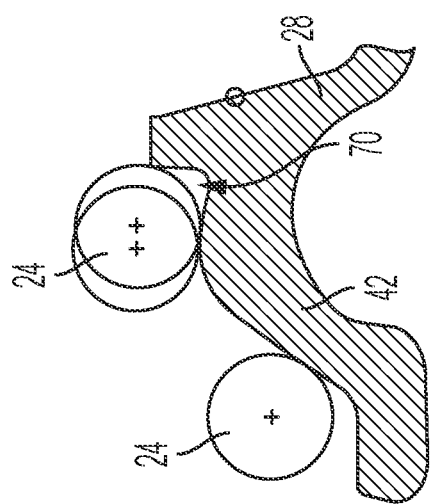
FIG. 8 is a schematic representation of contact locations between the cam follower and the cam.

Referring now to FIG. 7, the member 36 of the cam follower 24 is shown in the locked position of the cam clamping assembly 20. In particular, the member 36 is seated within a recessed portion 70 of the member 42 of the cam 28. This arrangement of the cam follower 24 and the cam 28 allows an operator to manually feel the locked position being achieved based on the required lock load effort decreasing after a maximum height of the ramp profile is passed by the member 36 of the cam follower 24. FIG. 8 further shows an embodiment of the member 42 of the cam 28, where the maximum height of the ramp profile is shown. In other words, the maximum lever effort occurs prior to the maximum ramp profile position due to the steeper slope of the ramp at such a position when compared to the maximum ramp profile position. The slope steepness then decreases to allow the operator to feel the locked position being fully achieved. FIG. 9 graphically illustrates the lever effort required over the full range of travel, i.e. from the unlocked position to the locked position and vice versa.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A cam clamping assembly for an adjustable steering column assembly, the steering column assembly adjustable in an unlocked position of the cam clamping assembly and in a fixed position in a locked position of the cam clamping assembly, the cam clamping assembly comprising:
    a lever rotatable between the locked position and the unlocked position of the cam clamping assembly;
    a cam follower operatively coupled to the lever and rotatable with the lever, the cam follower having an inner surface with at least one cam follower member extending therefrom; and
    a cam having an outer surface in contact with the inner surface of the cam follower, wherein the outer surface of the cam includes at least one cam member extending therefrom and in contact with the cam follower member, wherein the cam member is a ramped surface having a contact path portion and at least one relief portion, the at least one relief portion comprising a lock relief portion and an unlock relief portion, wherein the lock relief portion is located on a radially outer portion of the cam member relative to a central axis of the cam, wherein the unlock relief portion is located on a radially inner portion of the cam member relative to the central axis of the cam, wherein the cam follower member is only in contact with the contact path portion of the cam member during relative movement between the cam follower and the cam, wherein an average contact radius path is a radial length from the central axis of the cam and the midpoint of the overall surface contact between the cam follower and the cam, wherein the radial length is shortened along the path adjacent to the lock relief portion compared to the radial length along the path adjacent to the unlock relief portion.

2. The cam clamping assembly of claim 1, wherein the at least one relief portion includes a stepped drop adjacent to the contact path portion.

3. The cam clamping assembly of claim 1, wherein the at least one relief portion includes a sloped transition leading from the contact path portion.

4. A cam clamping assembly for an adjustable steering column assembly, the steering column assembly adjustable in an unlocked position of the cam clamping assembly and in a fixed position in a locked position of the cam clamping assembly, the cam clamping assembly comprising:
    a lever rotatable between the locked position and the unlocked position of the cam clamping assembly;
    a cam follower operatively coupled to the lever and rotatable with the lever, the cam follower having an inner surface with at least one cam follower member extending therefrom; and
    a cam having an outer surface in contact with the inner surface of the cam follower, wherein the outer surface of the cam includes at least one cam member extending therefrom and in contact with the cam follower member, wherein the cam member is a ramped surface having a contact path portion and at least one relief portion, the at least one relief portion comprising a lock relief portion and an unlock relief portion, wherein the lock relief portion is located on a radially outer portion of the cam member relative to a central axis of the cam, wherein the unlock relief portion is located on a radially inner portion of the cam member relative to the central axis of rotation of the cam, wherein the at least one relief portion has at least one variation from the contact path portion, wherein an average contact radius path is a radial length from the central axis of the cam and the midpoint of the overall surface contact between the cam follower and the cam, wherein the radial length is shortened along the path adjacent to the lock relief portion compared to the radial length along the path adjacent to the unlock relief portion.

5. The cam clamping assembly of claim 4, wherein the at least one variation is defined by the at least one relief portion being a recessed portion relative to the contact path portion, wherein the cam follower member is only in contact with the contact path portion of the cam member during relative movement between the cam follower and the cam.

6. The cam clamping assembly of claim 5, wherein the at least one relief portion includes a stepped drop adjacent to the contact path portion.

7. The cam clamping assembly of claim 5, wherein the at least one relief portion includes a sloped transition leading from the contact path portion.

8. The cam clamping assembly of claim 4, wherein the at least one variation is defined by the at least one relief portion having a surface texture different from the contact path portion.

9. The cam clamping assembly of claim 8, wherein the surface texture of the at least one relief portion has a coefficient of friction less than a coefficient of friction of the contact path portion.

* * * * *